April 2, 1968  H. A. WILLETT  3,375,642
SUGAR CANE HARVESTERS
Filed Jan. 18, 1965  8 Sheets-Sheet 1

INVENTOR
Harold A. Willet
BY Wilkinson, Mawhinney & Theibautt
ATTORNEYS

April 2, 1968  H. A. WILLETT  3,375,642
SUGAR CANE HARVESTERS
Filed Jan. 18, 1965  8 Sheets-Sheet 3
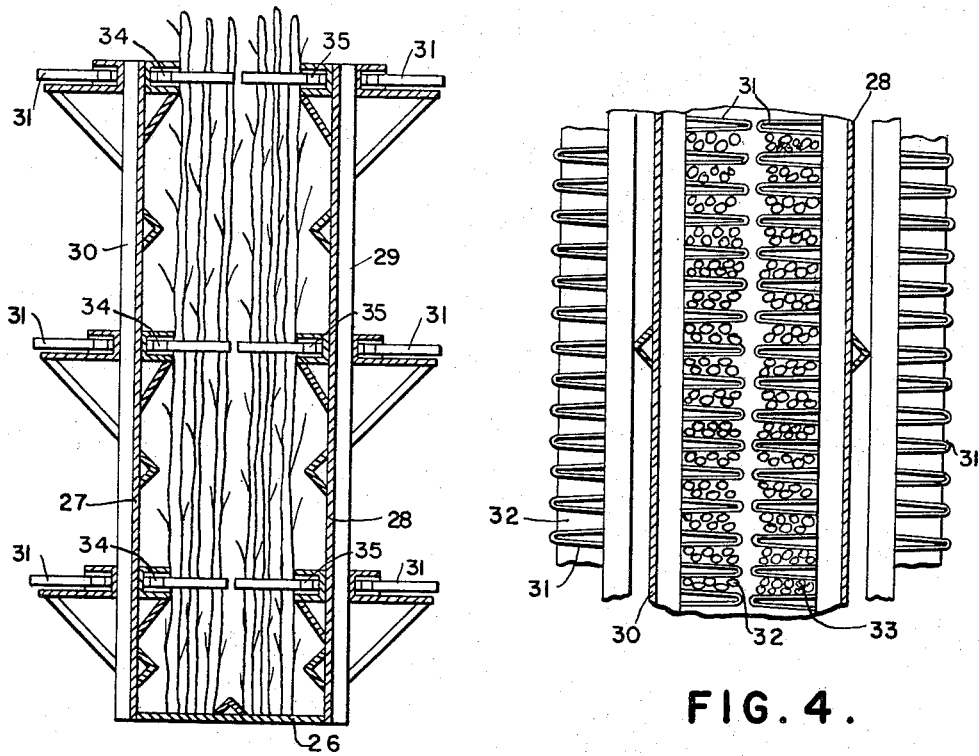
FIG. 3.
FIG. 4.
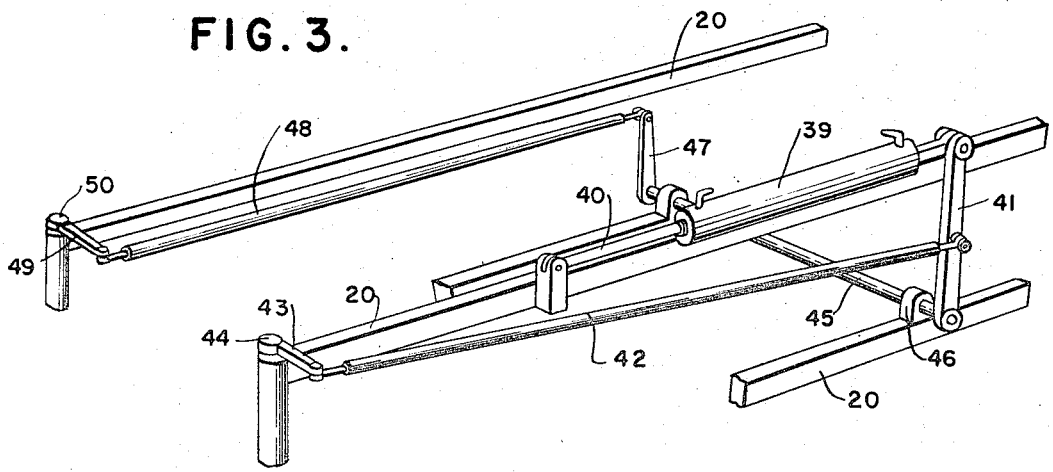
FIG. 5.
INVENTOR
Harold A. Willet
BY Wilkinson, Mawhinney & Theibault
ATTORNEYS April 2, 1968  H. A. WILLETT  3,375,642
SUGAR CANE HARVESTERS
Filed Jan. 18, 1965  8 Sheets-Sheet 5
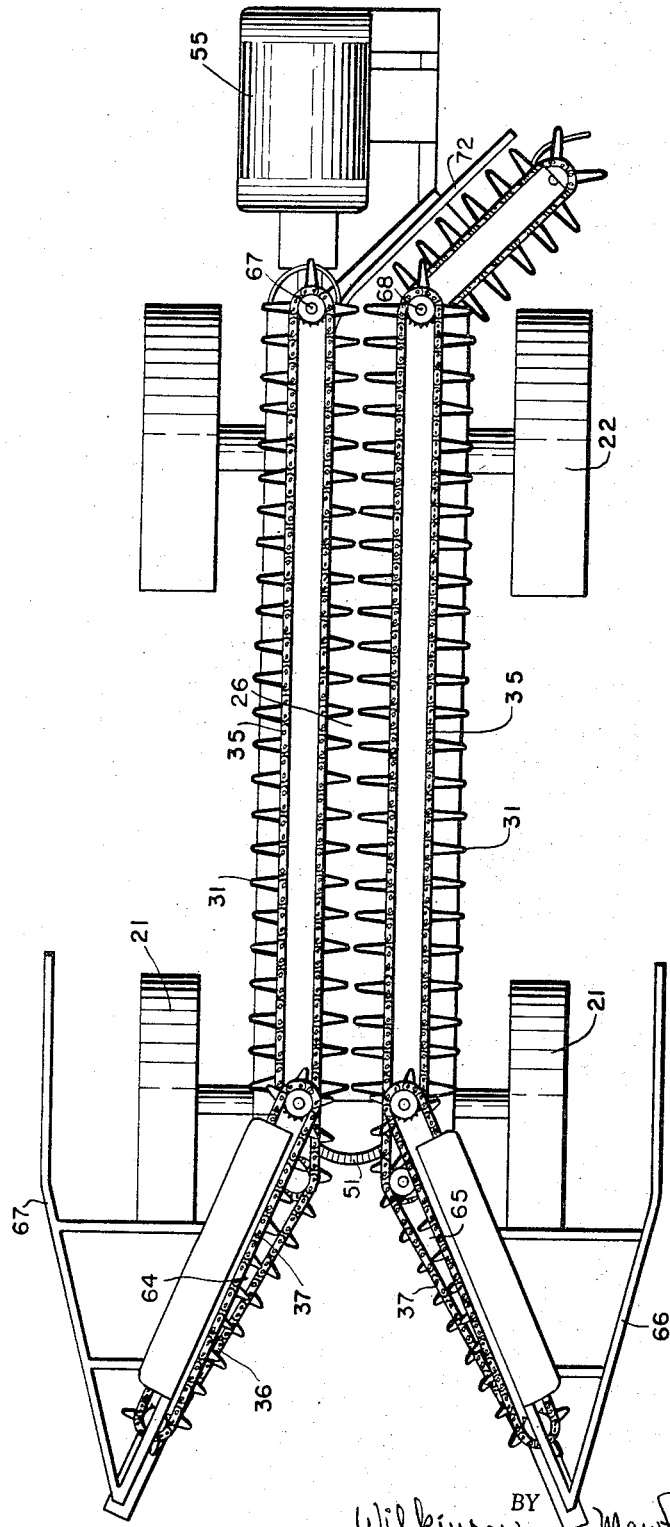
FIG. 7.
INVENTOR
Harold A. Willet
ATTORNEYS

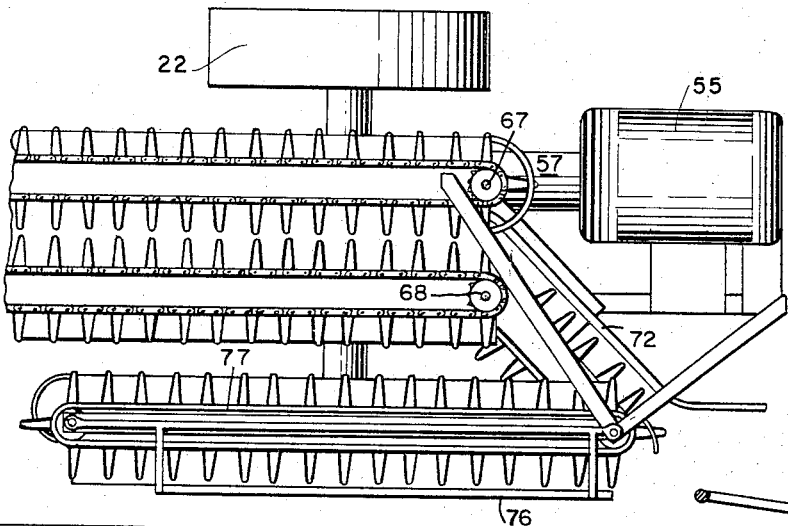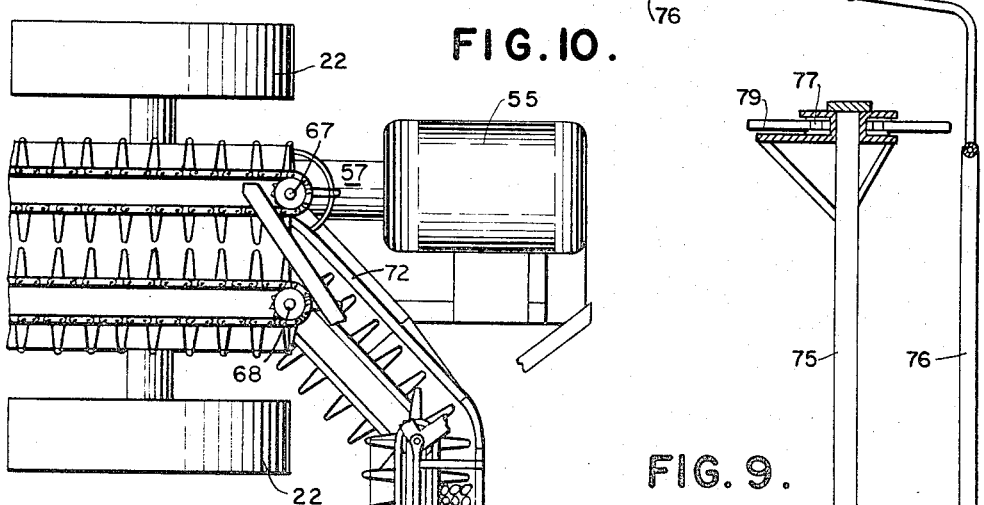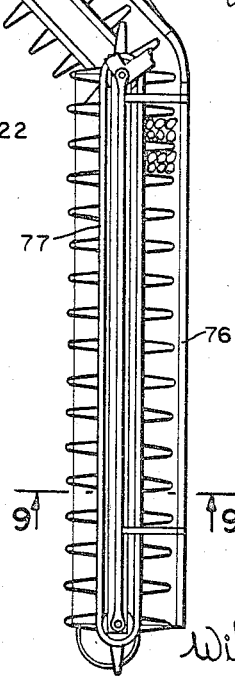

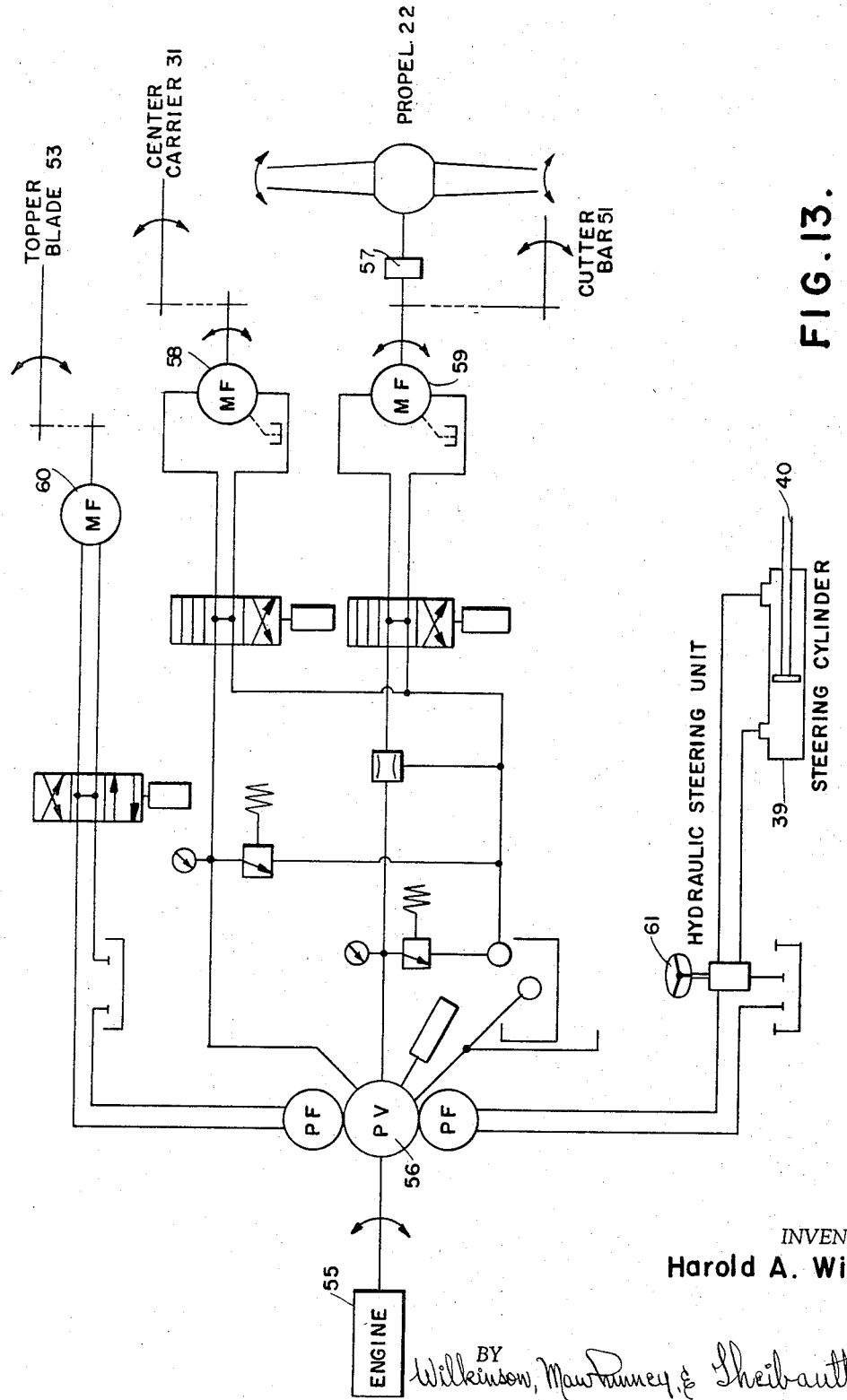

United States Patent Office 3,375,642
Patented Apr. 2, 1968

3,375,642
SUGAR CANE HARVESTERS
Harold A. Willett, Thibodaux, La., assignor, by mesne assignments, to The Thomson Machinery Company, Inc., Thibodaux, La., a corporation of Delaware
Filed Jan. 18, 1965, Ser. No. 426,090
2 Claims. (Cl. 56—15)

ABSTRACT OF THE DISCLOSURE

The present invention relates to an apparatus and method for harvesting sugar cane and is directed to a harvester which handles bulk quantities of sugar cane without impailing or damaging the cane stalk along its length which results in rapid deterioration of the cane stalk and early decomposition thereof. This is accomplished by cutting the cane stalks and sliding them through the harvester on their ends in gang groups and then placing them onto heap rows.

---

The present invention relates to improvements in sugar cane harvesters and has for an object to provide a high capacity harvester capable of harvesting heavy tonnage cane with a minimum of waste.

In the conventional sugar cane harvester, as shown in Thomson U.S. Patent 2,427,313, FIGURE 4 thereof, and Thomson U.S. Patent 3,090,183, FIGURE 8 thereof, it will be noted that the volume of cane (number of cane stalks) actually passing through the harvester at any time is relatively small. This was because there was a narrow channel between a sticker chain and pressure bar, there also being the additional problem of the sticker chain having to physically impale the cane stalk resulting in a bleeding of the stalk and loss of sugar in addition to permitting rapid decomposition of the cane stalk.

The harvester of the present invention provides an elongated longitudinal trough, the bottom of which physically supports the cane stalks once they have been severed from the earth and permits the cane to be slid along the bottom of the trough on its butt end without the necessity of impaling the cane stalk.

Another object of the present invention is the fact that the gathering chains, conveyor chains and forward speed of the harvester may be operated independently of one another or synchronized as dictated by field conditions.

A further object of the present invention is a harvester having a two-part frame which consists of a ground travelling and supporting frame on the one hand and the cane handling frame on the other hand with provision for controlling relative movement between the two frames.

A further object of the present invention is an all hydraulically powered harvester, that is, propulsion, steering, cane cutting, frame raising and lowering and cane carrying being subject to slow or fast operation, each independent of any of the others.

A still further object of the present invention is the provision of a piler for receiving cut cane from the harvester and distributing the cane at high capacity without impaling the cane and which is an improvement over the piler shown and described in U.S. Patent No. 2,427,313.

With the foregoing and other objects in view the invention will be more fully described hereinafter and will be more particularly pointed out in the claims appended hereto.

In the drawings, wherein like symbols refer to like or corresponding parts throughout the several views:

FIGURE 3 is a vertical section taken on line 3—3 of FIG. 1, through the cane conveying trough of the vehicle of FIGURES 1 and 2.

FIGURE 4 is a top plan view of the area of the trough of FIGURE 3.

FIGURE 5 is a perspective view of the steering mechanism.

FIGURE 7 is a top plan view of the vehicle of FIGURES 1 and 2 showing the cane handling chains and drives.

FIGURE 8 is a top plan view of the piler employed with the vehicle of FIGURES 1 and 2.

FIGURE 9 is a vertical section through the piler taken on the line 9—9 in FIGURE 8.

FIGURE 10 is a top plan view of the piler of FIGURES 8 and 9 shown in the rigged-in position.

FIGURE 13 is a hydraulic schematic of the various hydraulically controlled mechanisms on the harvester of FIGURES 1 and 2.

Figure 1:
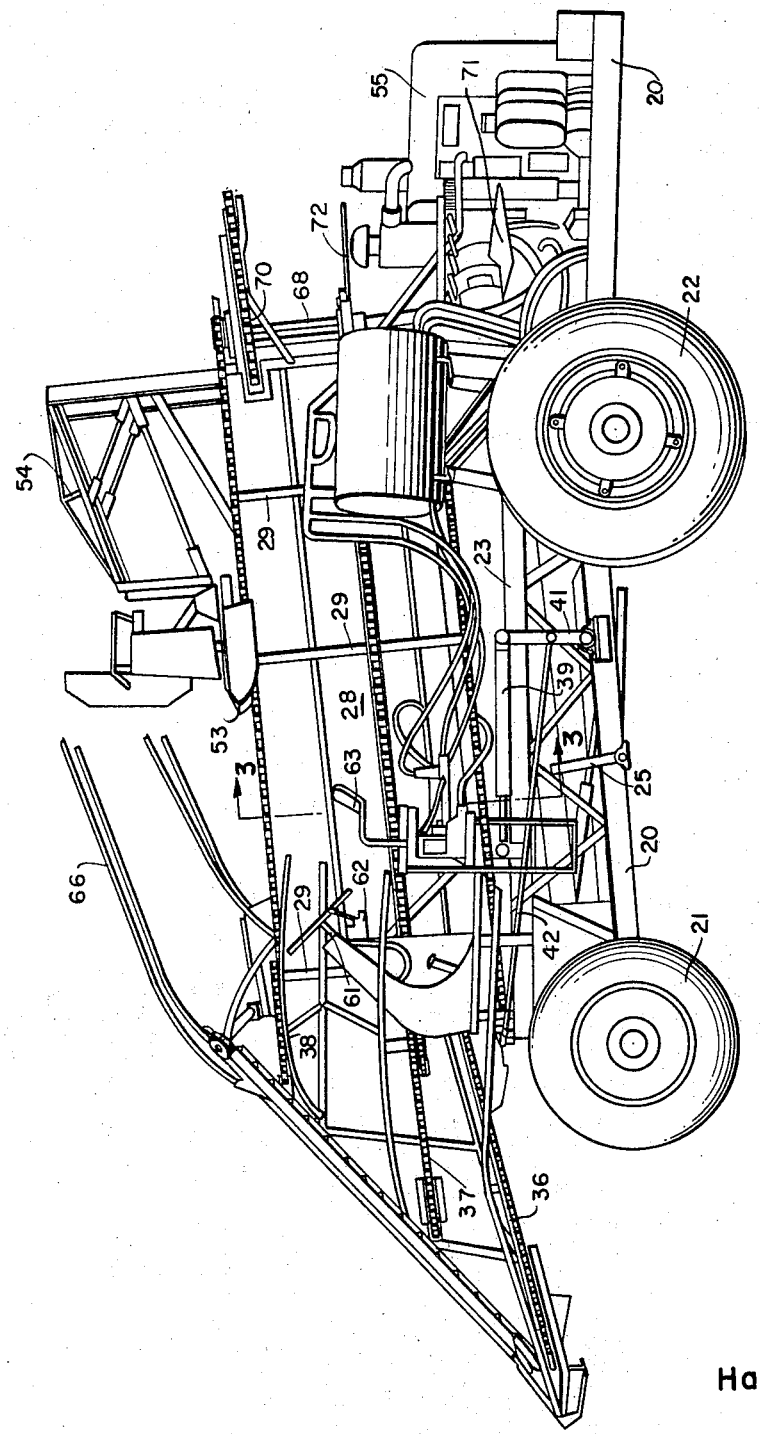
FIGURE 1 is a side elevational view of a harvester constructed in accordance with the present invention.
Figure 11:
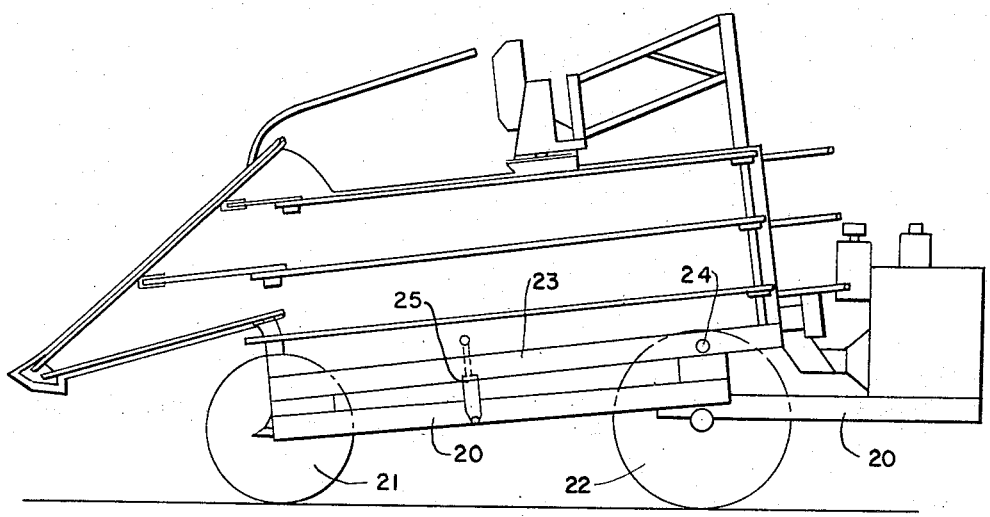
FIGURES 11 and 12 are schematic views of the harvester frame of the vehicle of FIGURES 1 and 2 showing the harvesting portion of the vehicle in its raised and lowered position respectively.
Figure 12:
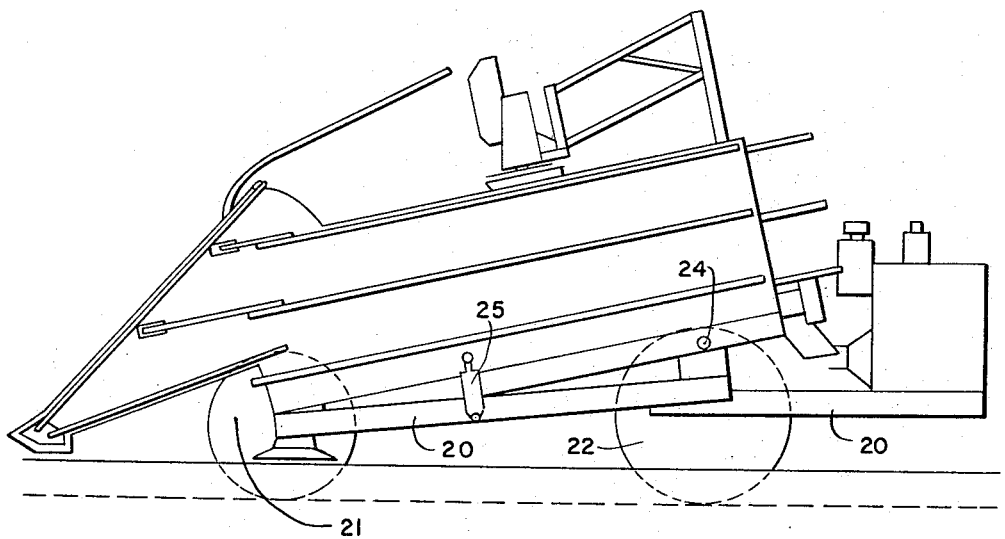

Referring for the moment to FIGURES 1, 11 and 12, it will be noted that the harvester has a mobile frame 20 supported on front and rear wheels 21 and 22, respectively. The harvester frame assembly 23 is pivoted to the mobile frame assembly at 24 and is shown in FIGURE 11 in the elevated or highway transport position while the same is shown in the lowered or cane cutting position in FIGURE 12. Forwardly of the pivot and connecting the two frame sections is a hydraulic cylinder and ram assembly 25 for raising and lowering the harvester frame relative to the mobile frame about the pivot 24.

Figure 2:
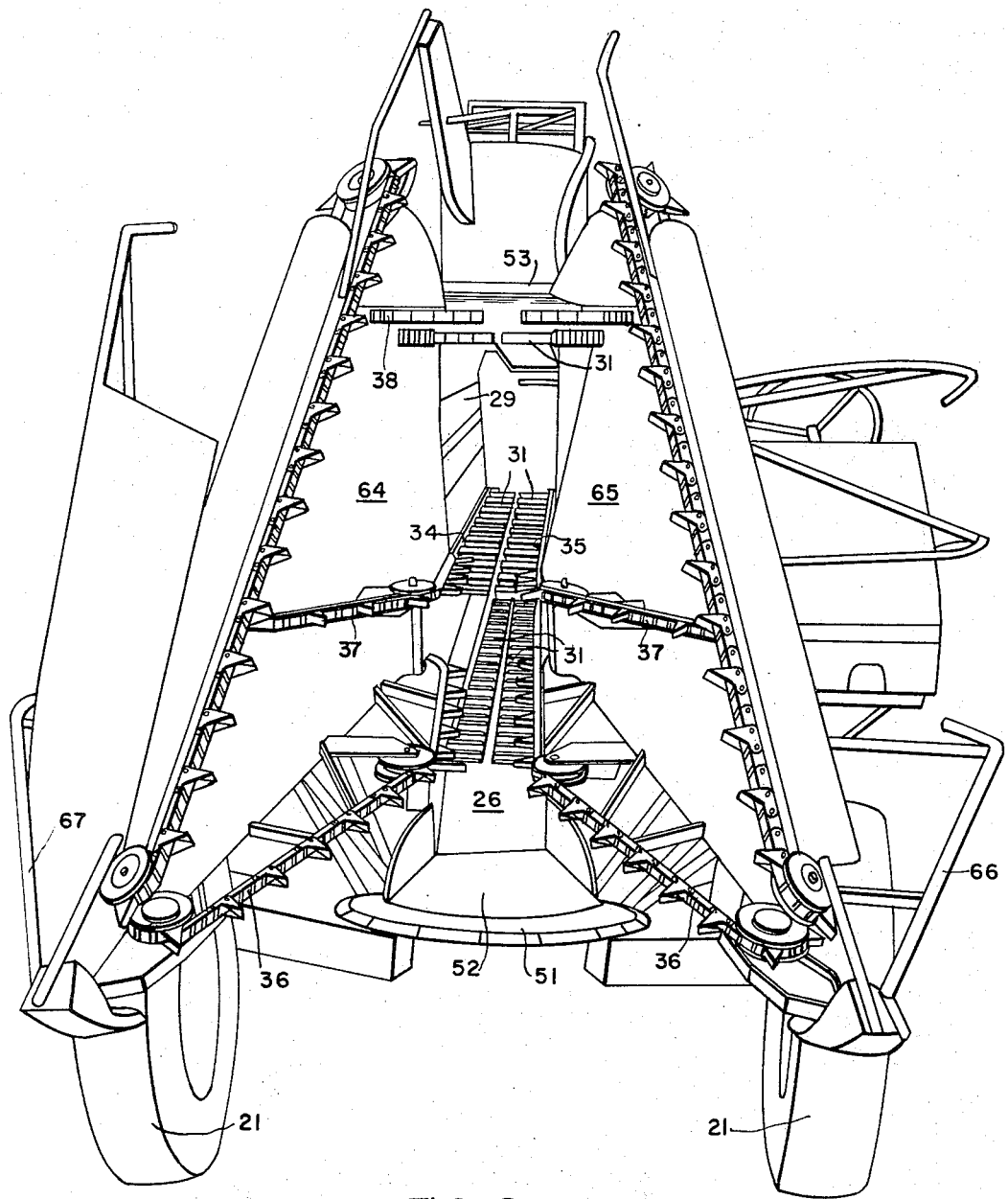
FIGURE 2 is a front elevational view of the vehicle of FIGURE 1.

Referring now to FIGURES 2, 3 and 4, the central trough and cane conveying area of the apparatus is shown as having a bottom 26 and side walls 27 and 28. The side walls 27 and 28 are reinforced by ribs 29 and 30 running longitudinally along the length of the harvester. Mounted within the trough are the longitudinal conveyor cane engaging means 31, as best seen in FIGURE 7, which run along the length of the trough and which are mounted on endless chains and which endless chains are three in number on each side, being mounted vertically one above another and being spaced apart for engaging the stalks proximate their bottoms, tops and medial portions causing the stalks to move through the trough in a generally upright attitude.

Intermediate each of the cane engaging members 31 is defined a pocket 32 for receiving the severed cane stalks 33 in gangs or groups for moving the cane stalks rearwardly as by sliding the severed cane stalks on their butts along the bottom of the trough 26 without impaling the stalk resulting in a bleeding or loss of sugar content. The cane engaging members 31 are carried on endless chains 34, 35.

At the front end of the harvester are three groups of gathering chains 36, 37 and 38 for introducing the sugar cane into the throat of the harvester and presenting it to the trough.

Mounted on the side of the harvester frame 20 is a cylinder and ram assembly 39, 40, the one end of the ram 40 being secured to the frame 20 and one end of the cylinder 39 being pivotally connected to a lever arm 41. The lever arm 41 has connected thereto a rod 42 for acting upon a steering knuckle 43 secured to a steering shaft 44 for controlling the steering of the front wheels 21. Secured to rock with the lever 41 is a shaft 45 journalled in a bearing 46 carried by a part of the mobile frame 20 for communicating angular movement of shaft 45 from the piston side of the frame 20 over to the other side causing lever 47, which is secured to shaft 45, to move rod 48, its steering knuckle 49 to rotate shaft 50 in synchronism with shaft 44 whereby both front wheels of the harvester are steered in synchronism.

Positioned beneath the trough bottom 26 and in advance thereof is a hydraulically driven cane cutting rotary knife 51 which is hydraulically driven and rotated at a speed adequate to sever standing cane stalks from the ground, which stalks due to the forward motion of the machine then skid up upon an apron 52 and enter the trough and are engaged by the cane engaging members 31 causing the cane stalks to be skidded on their butts along the trough bottom 26.

About midway along the longitudinal trough and positioned above same is a cane topping knife 53 mounted in a pantograph frame 54 for raising and lowering the topping knife as harvesting practice dictates to be appropriate depending upon the line of maturity of the cane stalk.

The harvester is provided with a prime mover in the form of an engine 55 which may be either gasoline or diesel for driving hydraulic pumps 56 for supplying motive fluid to a turbine drive 57 for propelling the rear wheels 22 of the harvester, while also supplying motive fluid to a pump 58 for driving the cane engaging chains and cane engaging members 31 for moving the cane through the trough. Hydraulic fluid is also supplied for actuating the earth severing cutter from pump 59 while pump 60 provides motive fluid for actuating the topper blade 53. Hydraulic fluid is also supplied for the steering unit 61 for controlling the rate of fluid to and from the ram and cylinder assembly 39, 40.

Suitable control valves for each of these units are provided in the hydraulic lines and are present on an operating console 62 conveniently located beside the steering wheel 61 at a driver's seat 63.

Suitable shields 64, 65 are located at the front end of the harvester and converge rearwardly forming a throat into which the standing cane is introduced toward the longitudinal trough. The harvester is provided with well-known and conventional cane guards 66 to deflect standing cane from adjacent rows clear of the harvester mechanism to avoid dragging of the standing cane by the harvester incident to its travel through a field of standing cane.

Figure 6:
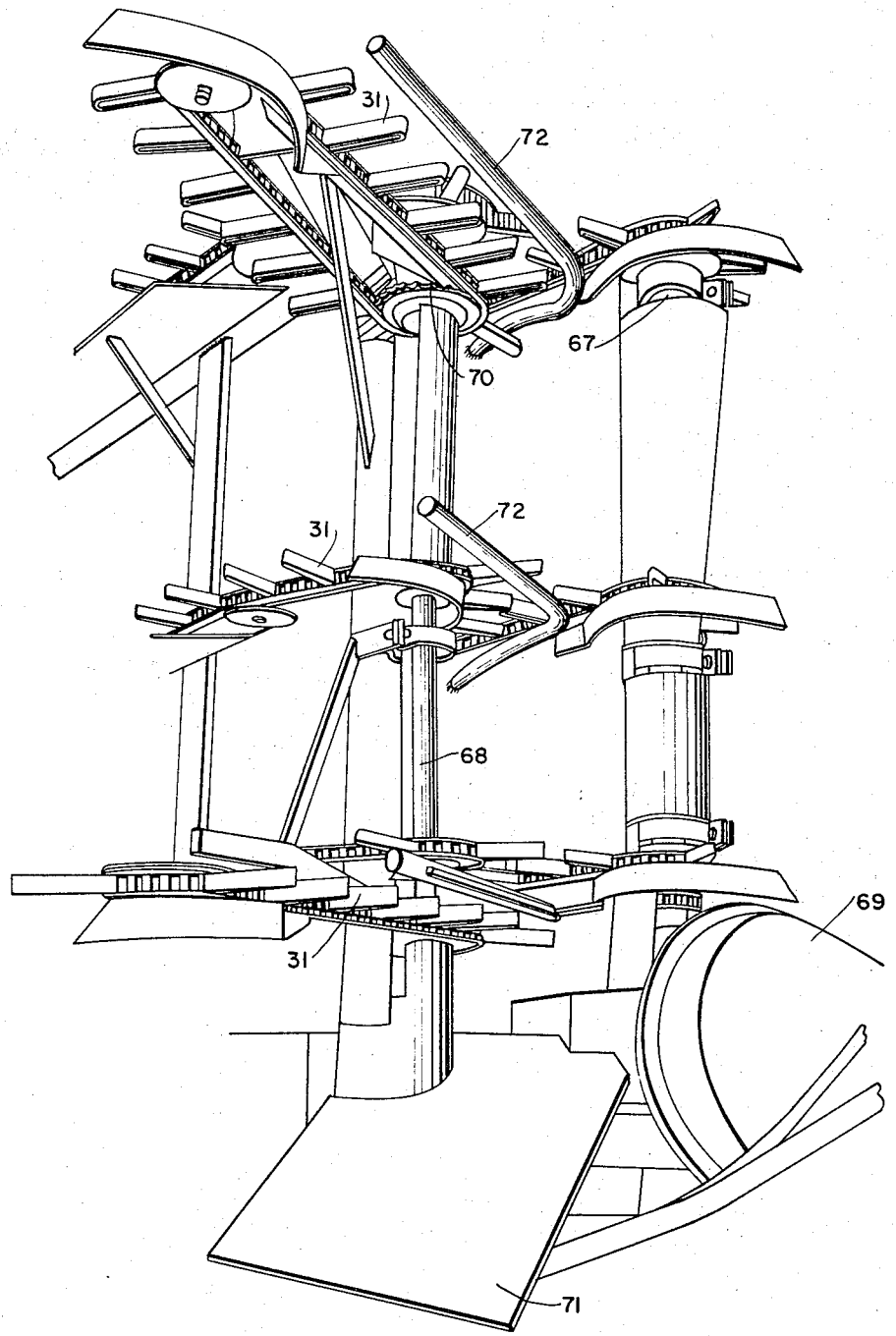
FIGURE 6 is a rear perspective view of the discharge end of the conveying trough of the vehicle of FIGURES 1 and 2.

Located at the rear of the harvester are two vertical columns 67, 68 which are driven from a power transmission 69 from the hydraulic motors for causing rotation of the shafts 67, 68. Sprockets 70 are keyed to be rotated with the shafts 67, 68 for imparting motion to the chains 34, 35 carrying the cane engaging members 31. This is best seen in FIGURE 6.

Located also at the rear of the harvester is a downwardly bent skid plate 71 from which the cane stalks slide from the machine as by their butts, skidding down the plate 71. Suitable guide deflector bars 72 are placed to guide the cane in a direction to one side at the rear of the harvester.

Referring now to FIGURES 8, 9 and 10, a new form of piler embodying the principle of this harvester construction is shown. This piler is similar to the piler illustrated and described in the aforementioned U.S. Letters Patent No. 2,427,313 with the exception that this piler does not impale the cane stalks by a sticker chain but is provided with a trough assembly 73 having a bottom 74, upstanding side walls 75 and 76, the side wall 75 supporting endless chains 77, 78 carrying cane engaging members 79 similar to the cane engaging members 31, permitting groups or gangs of cane stalks to be moved simultaneously through the piler with their butts skidding on the trough bottom 74. The piler is gated as in the aforementioned piler for doing three-row heaps and is rigged in forming a compact unit when not in use, as shown in FIGURE 10.

Although I have disclosed herein the best forms of the invention known to me at this time, I reserve the right to all such modifications and changes as may come within the scope of the following claims.

What is claimed is:
1. A sugar cane harvester comprising
   (a) a hydraulically propelled mobile frame adapted to straddle a row of standing cane and move therealong
   (b) cane severing means located centrally of the harvester for severing the standing cane from the earth
   (c) hydraulically driven gathering chains at the leading end of and carried by said mobile frame converging to a throat area
   (d) a support on the harvester at a low elevation at its leading end in registry with said throat area and being elevatable at its rear end, said support being adapted to receive cut cane stalks on their butt ends
   (e) cane moving means carried by said support and being adapted to move cane stalks through said support means in gang groups without impailing the stalks while supporting same on their butt ends, and
   (f) cane selective placement means carried by said mobile frame and positioned to receive cane stalks from said cane moving means and to convey the cut cane stalks laterally of the path of said harvester while supporting the cane stalks on their butt ends without impailment for discharge onto heap rows.

2. A sugar cane harvester as claimed in claim 1 further comprising hydraulic raising and lowering means between said mobile frame and said support to permit the gathering chains to be raised and lowered to get under down cane.

References Cited

UNITED STATES PATENTS

| | | | |
|---|---|---|---|
| 2,215,554 | 9/1940 | Logan | 56—15 |
| 2,427,313 | 9/1947 | Thomson | 56—15 |
| 2,748,552 | 6/1956 | Pool et al. | 56—15 |
| 2,840,973 | 7/1958 | Thomson et al. | 56—15 |
| 2,953,886 | 9/1960 | Douglas et al. | 56—17 |
| 3,002,330 | 10/1961 | Thomson | 56—17 |
| 3,095,679 | 7/1963 | Pugh et al. | 56—15 |

ABRAHAM G. STONE, *Primary Examiner.*

ANTONIO F. GUIDA, *Examiner.*